United States Patent [19]

Pinkas

[11] 4,058,340
[45] Nov. 15, 1977

[54] RETAINER FOR SUN VISOR EXTENSION

[76] Inventor: David Pinkas, 15239 Agua Fria Drive, Sun City, Ariz. 85351

[21] Appl. No.: 675,148

[22] Filed: Apr. 8, 1976

[51] Int. Cl.² .............................................. B60J 3/02
[52] U.S. Cl. ................................ 296/97 G; 296/97 H
[58] Field of Search ................. 296/97 K, 97 H, 97 G

[56] References Cited
U.S. PATENT DOCUMENTS

| 2,685,474 | 8/1954 | Ingraham | 296/97 H |
| 3,853,370 | 12/1974 | Barnhart | 296/97 G |

Primary Examiner—Philip Goodman
Attorney, Agent, or Firm—Cahill, Sutton & Thomas

[57] ABSTRACT

A retainer slidably maintains a sun visor extension adjacent a sun visor while accommodating lateral and longitudinal displacement of the extension with respect to the sun visor.

6 Claims, 5 Drawing Figures

RETAINER FOR SUN VISOR EXTENSION

The present invention relates to sun shields and, more particularly, to sun visor extension retainers mounted upon automobile sun visors.

An automobile sun visor is generally pivotable about a vertical axis to position the sun visor adjacent the windshield or a side window. In addition, the sun visor is pivotable about a horizontal axis from a position adjacent the roof of the automobile to a position adjacent the windshield or a side window. Often, the position of the sun with respect to the automobile occupant's line of vision is such that the sun visor will not effectively shield the occupant's eyes from the direct rays of the sun.

To increase the shielding capability of automobile sun visors, many sun visor extensions have been developed over the years. U.S. Pat. Nos. 2,736,374, 2,833,591 and 3,206,244, describe planar members slidably attached to sun visors by resilient straps or bands. These extensions increase the shielding capability of the sun visor but the method of attachment to the sun visor requires the employment of two hands to properly position the extension; moreover, the point of attachment between the extension and the resilient members will not preclude flopping of the extensions as the vehicle travels over rough surfaces. U.S. Pat. Nos. 2,096,142, 2,458,125 and 3,201,170, illustrate various sun visor extensions which are pivotally attached to the sun visor. These extensions, as a practical matter, must be fully pivoted to prevent physical interference with the proximate occupant of the vehicle, thereby necessitating greater shielding than may be optimum and potentially creating a hazardous situation whereby the view may become too restricted. Moreover, the pivoting means deployed in U.S. Pat. Nos. 2,458,125 and 3,201,170 is relatively expensive to manufacture.

U.S. Pat. No. 3,499,679, illustrates a slidable and pivotable sun visor extension but the means for securing it to the sun visor are quite elaborate and relatively expensive to manufacture. U.S. Pat. No. 2,685,474, illustrates a further sun visor extension which requires a specially configured sun visor as a replacement for existing sun visors in automobiles.

It is therefore a primary object of the present invention to provide an extension for a sun visor which is deployable in conjunction with all presently manufactured automobile sun visors.

Another object of the present invention is to provide an extension for a sun visor which is positionable with one hand.

Yet another object of the present invention is to provide an extension for automobile sun visors which can be selectively extended laterally and longitudinally.

A further object of the present invention is to provide an extension for sun visors which remains parallel to the sun visor regardless of the degree of deployment of the extension.

A yet further object of the present invention is to provide an inexpensive extension for automobile sun visors.

A still further object of the present invention is to provide an extension for sun visors which does not restrict nor constrain the normal operation of existing sun visors to which it may be attached.

These and other objects of the present invention will become apparent to those skilled in the art as the description thereof proceeds.

The present invention may be described with greater specificity and clarity with reference to the following drawings, in which.

Figure 1:
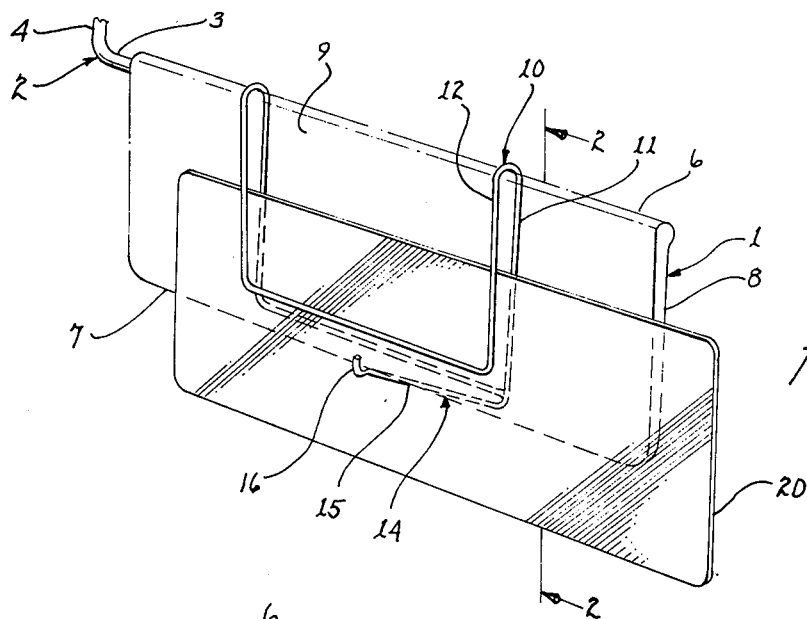
FIG. 1 is a perspective view of a representative sun visor having retaining means attached thereto for slidably engaging an extension.
Figure 2:
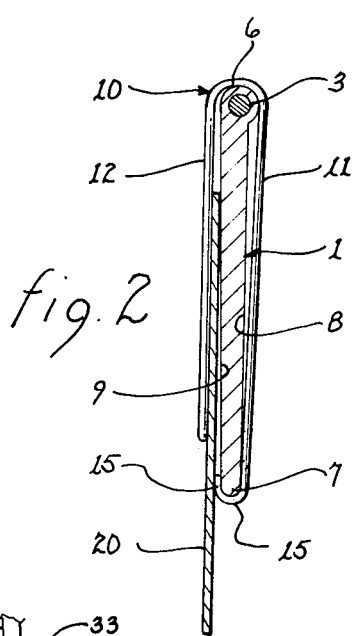
FIG. 2 is a cross-sectional view taken along lines 2—2, as shown in FIG. 1.
Figure 3:
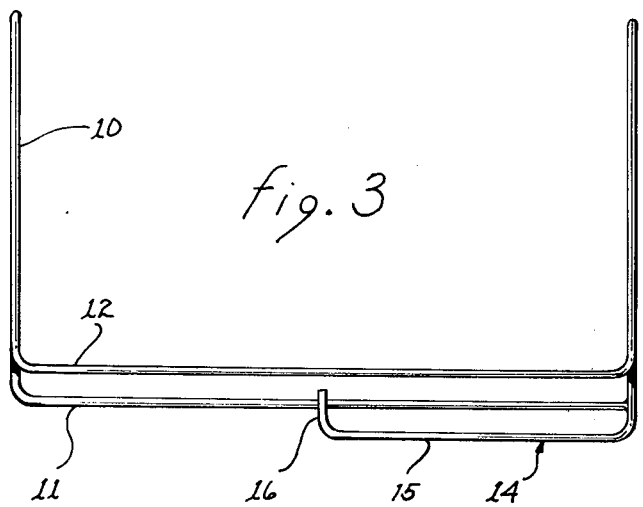
FIG. 3 is a side view of the retainer for the sun visor extension.

Referring jointly to FIGS. 1, 2 and 3, there is illustrated a sun visor 1 having a shield 20 attached thereto by a wire frame 10. The sun visor, representative of a conventional sun visor used in automobiles and other vehicles, is normally attached to the roof of the vehicle through a support 2. The support includes arms 3 and 4. Arm 3 serves as a horizontal axis about which the sun visor is pivotable. Arm 4 is normally pivotally attached to the roof of the vehicle and defines a vertical axis about which the sun visor is pivotable.

Wire frame 10 is essentially a rectangular frame folded upon itself to define U-shaped sections 11 and 12. The spacing between these two sections is such as to compressively grip the sun visor; thereby, by positioning the fold of the wire frame so as to partially circumscribe edge 6 of the sun visor, the base legs of the U-shaped sections are in proximity to the parallel opposed sides 8 and 9 of the sun visor, as illustrated. An extension 14, attached to one corner of U-shaped section 11, includes a leg 15 extending transversely across edge 7 of sun visor 1. A prong 16, extending upwardly from the leg, is positioned adjacent side 9 to maintain the transverse orientation of leg 15. The angular orientation of leg 15 is such as to cause prong 16 to be drawn toward U-shaped section 11 and grip the sun visor therebetween. Thereby, prong 16 maintains leg 15 transverse to edge 7 of the sun visor and the leg precludes upward movement of wire frame 10.

Shield 20, which may be a rectangular element of opaque, translucent or transparent light filtering material, is disposed adjacent side 9 of sun visor 1. It is biased thereagainst by U-shaped section 12. The bias or compressive force exerted by wire frame 10 through U-shaped section 12 is sufficient to preclude inadvertent repositioning of shield 20 and yet yieldingly permit deliberate downward or sideways movement of the shield. Thereby, the sun shielding effect of sun visor 1 can be extended laterally or longitudinally by simple lateral or longitudinal sliding of the shield with respect to the sun visor.

By developing wire frame from wire having a high degree of elasticity, such as the type normally referred to as "music wire", the biasing or gripping power of the wire frame will not appreciably diminish over a lengthy period of time.

Figure 4:
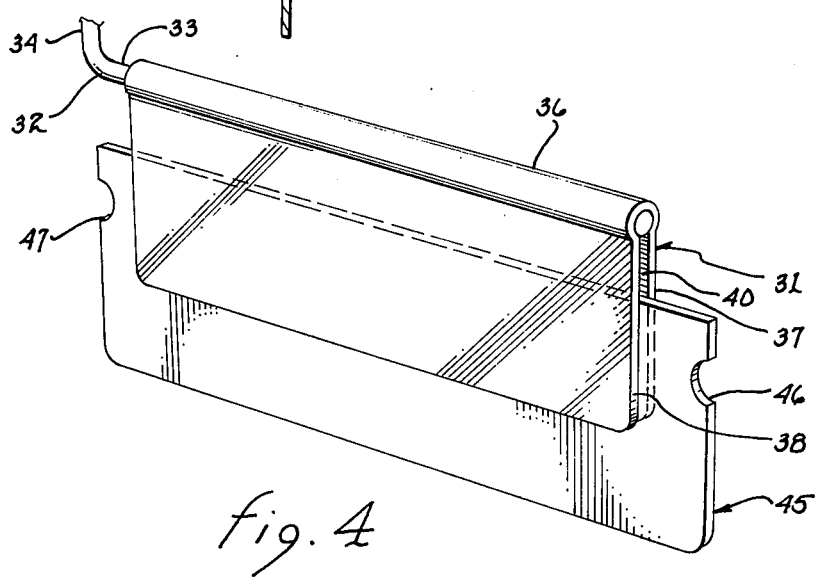
FIG. 4 is a perspective view of a variant of the present invention.
Figure 5:
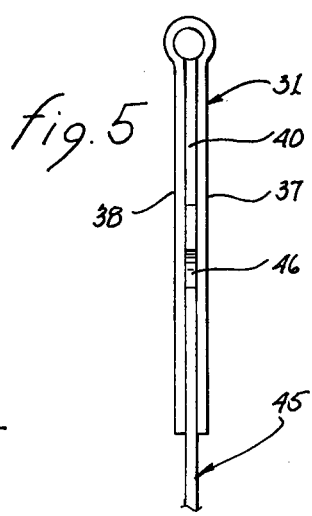
FIG. 5 is an end view of the variant shown in FIG. 4.

Referring jointly to FIGS. 4 and 5, there is illustrated a variant of the present invention. Sun visor 31 is constructed to include a pair of coincident plates 37 and 38 spaced apart from one another but interconnected through a resilient cylindrical section 36. The cylindrical section establishes a bias force tending to force the plates toward one another and compressively engage anything disposed therebetween. Moreover, cylindrical section 36 is configured to receivingly retain leg 33 of sun visor support 32. A leg 34 of support 32 is pivotally secured to the roof of the vehicle and provides for pivotal movement of the sun visor about a vertical axis while leg 33, in combination with cylindrical section 36, provides for pivotal movement of the sun visor about a horizontal axis.

A shield 45 is slidably retained within the space or passageway 40 intermediate plates 37 and 38. The biasing of the plates provides a gripping force for the shield while accommodating lateral and longitudinal positioning of the shield with respect to the sun visor. Notches 46 and 47 may be employed in the shield to facilitate manual gripping of the shield.

In both of the embodiments described above, the gripped shield is positionable so as to increase the shielding capability of the visor to which it is attached. Thereby, the utility of conventional sun visors has been greatly improved.

By analyzing the structure illustrated in FIGS. 1, 2 and 3, it may be readily perceived that the manufacture of the wire frame by well known techniques is relatively very inexpensive. Furthermore, the installation may be readily made by the purchaser with little fear of faulty installation or damage to the components.

As the wire frame continuously retains the shield parallel to the sun visor, repositioning of the shield with respect to the sun visor will not impinge upon or interfere with the space required by the occupant; furthermore, the retention feature of the wire frmae requires only that the shield be slid laterally or longitudinally to reposition it and such sliding movement is easily performed accurately with only one hand.

Shield 20 may be of any relatively stiff material, including cardboard. The shield may be imprinted with certain indicia useful to the driver of the vehicle or it may be imprinted with advertisements should the present invention be manufactured as a useful give-away article bearing advertisements.

The embodiment illustrated in FIGS. 4 and 5 necessarily must replace existing sun visors; however, it may be relatively inexpensively manufactured from one of the family of man-made plastics or it may be manufactured from composite materials. Here, also, the shield may be of any material sufficiently stiff or rigid to permit pushing and pulling to reposition it with respect to the gripping sun visor.

It may also be pointed out that as U-shaped section 11 bears against the adjacent surface of the sun visor, it may be used to retain various items, such as notes and addresses. Thereby, these items are readily visible and accessible to the driver when the sun visor is poisitioned at its normal location adjacent the vehicle roof.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. Apparatus for retaining a slidably positionable sun shield adjacent one surface of a vehicle mounted sun visor, said apparatus comprising in combination:
   a. a rectangular wire frame for partially transversely circumscribing the sun visor, said wire frame being folded upon itself to extend across one edge of the sun visor and define a first and second U-shaped section for exerting a gripping force upon opposed sides of the sun visor;
   b. a leg supported by said first U-shaped section and having a free end extending transverse to another edge of the sun visor for securing said wire frame about the sun visor; and
   c. a prong disposed at the free end of said leg for engaging the surface of the sun visor adjacent said second U-shaped section to maintain said leg transverse to the other edge of the sun visor;

whereby, on insertion of the shield intermediate said second U-shaped section and the adjacent surface of the sun visor, the gripping force exerted by said second U-shaped section retains the shield parallel and adjacent the sun visor while accomodating longitudinally and laterally directed slidable movement of the shield.

2. The apparatus as set forth in claim 1 wherein the depth of said first and second U-shaped sections is less than the height of the sun visor.

3. The apparatus as set forth in claim 2 wherein said leg is supported at one corner of said first U-shaped section.

4. The apparatus as set forth in claim 3 wherein the length of said leg is less than the width of said first U-shaped section.

5. The apparatus as set forth in claim 4 wherein the depth of said second U-shaped section is less than the depth of said first U-shaped section to preclude interference between said prong and said second U-shaped section.

6. Apparatus for selectively extending the sun shielding perimeter of a vehicle mounted sun visor, said apparatus comprising in combination:
   a. a rectangular wire frame for partially transversely circumscribing the sun visor, said wire frame being folded upon itself to extend across one edge of the sun visor and define a first and second U-shaped section for exerting a gripping force upon opposed sides of the sun visor;
   b. a leg supported by said first U-shaped section and having a free end extending transverse to another edge of the sun visor for securing, in combination with the folds of said rectangular wire frame, said wire frame about the sun visor;
   c. a prong disposed at the free end of said leg for engaging the surface of the sun visor adjacent said second U-shaped section to maintain said leg transverse to the other edge of the sun visor; and
   d. a sun shield slidably disposed intermediate said second U-shaped section and the adjacent surface of the sun visor;

whereby, the gripping force exerted by said second U-shaped section retains said sun shield parallel and adjacent the sun visor while accommodating longitudinally and laterally directed slidable movement of said sun shield.

* * * * *